United States Patent [19]

Gensike et al.

[11] Patent Number: 4,596,332
[45] Date of Patent: Jun. 24, 1986

[54] MICROFICHE TRANSFER SYSTEM

[75] Inventors: Karl H. Gensike, Canoga Park; Robert C. Marsh, Pacific Palisades, both of Calif.

[73] Assignee: Photomatrix Corporation, Santa Monica, Calif.

[21] Appl. No.: 623,122

[22] Filed: Jun. 22, 1984

[51] Int. Cl.[4] .................................................. B07C 5/34
[52] U.S. Cl. ........................................ 209/557; 198/572; 209/583; 235/475; 271/265; 355/99
[58] Field of Search .............. 209/3.3, 583, 557, 555; 271/258, 259, 262, 266, 265; 235/475, 476, 477, 480, 462; 355/99; 198/572

[56] References Cited

U.S. PATENT DOCUMENTS

| | | | |
|---|---|---|---|
| 3,097,745 | 7/1963 | Leo | 209/657 |
| 3,802,559 | 4/1974 | Luchetti | 209/583 |
| 3,988,017 | 10/1976 | Kyhl | 271/259 |
| 4,049,342 | 9/1977 | Hearon | 271/184 |
| 4,056,321 | 11/1977 | Gensike et al. | 355/99 |
| 4,188,114 | 2/1980 | Gensike et al. | 355/54 |
| 4,248,528 | 2/1981 | Sahay | 271/258 |
| 4,354,787 | 10/1982 | Gensike et al. | 271/217 |
| 4,451,144 | 5/1984 | Gensike et al. | 355/99 |

Primary Examiner—Robert B. Reeves
Assistant Examiner—Donald T. Hajec
Attorney, Agent, or Firm—Pastoriza, Kelly & Lowry

[57] ABSTRACT

A transfer system is utilized for automatically transporting a master microfiche from a computer output microfiche unit to a duplicator unit, thereby avoiding the physical handling of the microfiche by operating personnel. In addition to effecting the transfer of the microfiche, the transfer system further diverts those microfiche with errors in their bar code instructions to an error hopper so that optimum use of the duplicator time in making copies is assured. Appropriate switches are provided for diverting all microfiche to the error hopper when the duplicator is being serviced. Also, switches are provided for bypassing the bar code reader so that all microfiche will go to the feed hopper for the duplicator regardless of whether or not an error in the bar code exists.

6 Claims, 6 Drawing Figures

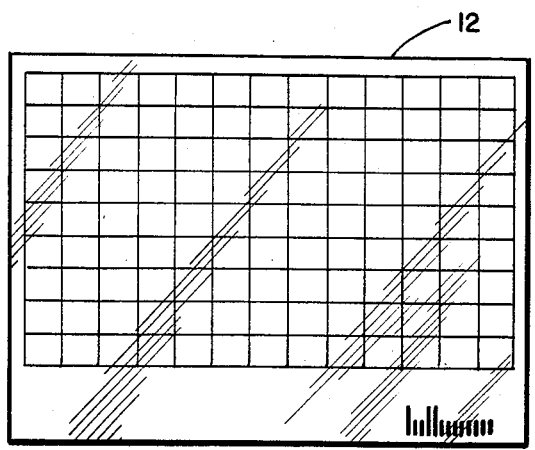
Fig. 3.    BAR CODE
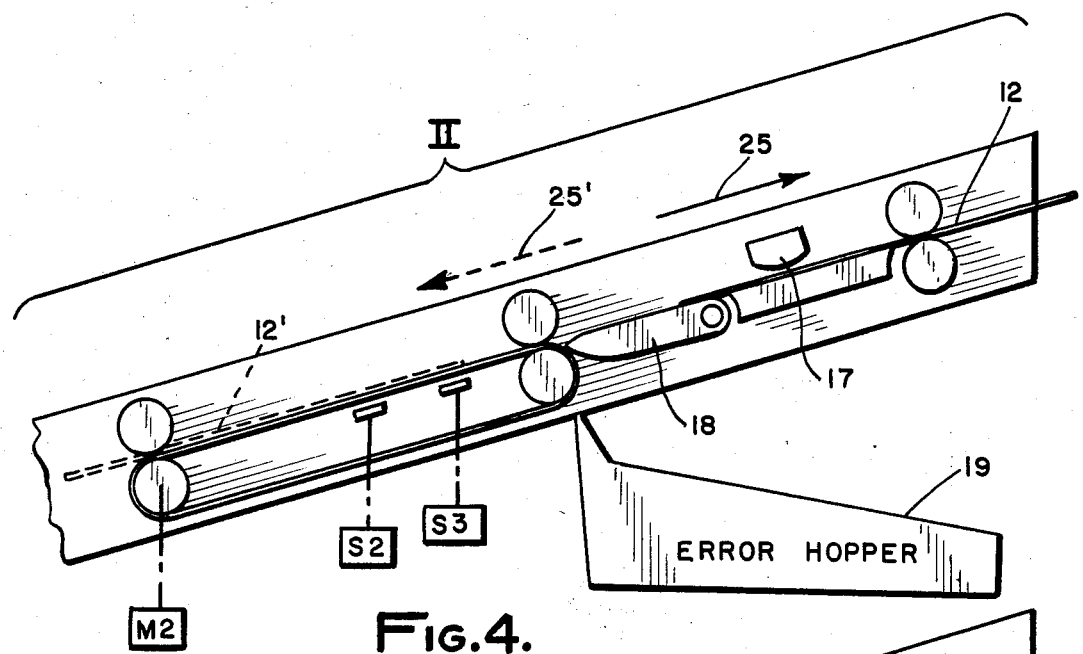
Fig. 4.
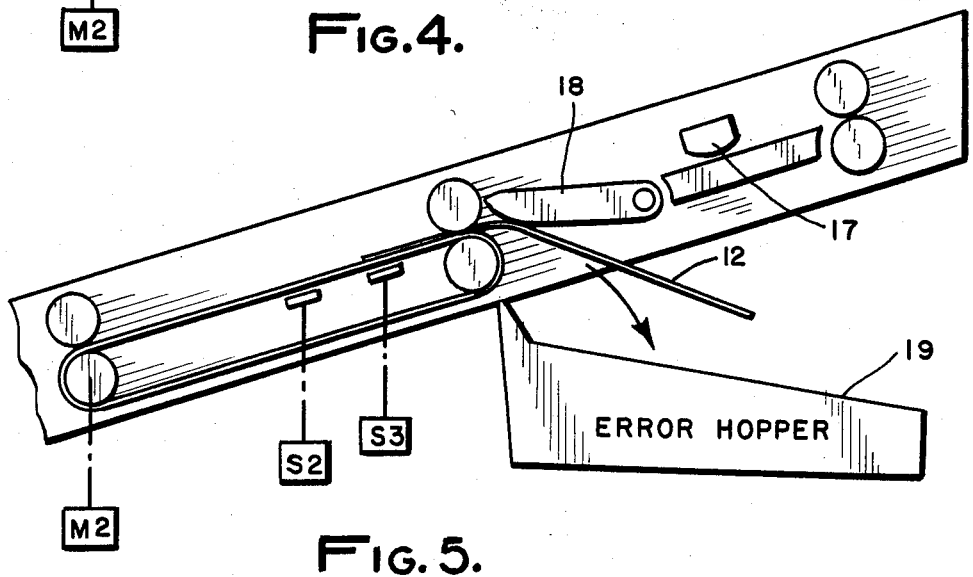
Fig. 5.

MICROFICHE TRANSFER SYSTEM

FIELD OF THE INVENTION

This invention relates generally to microfiche handling systems and more particularly to a transfer system for automatically transporting a master microfiche from a computer output microfiche unit to a duplicator unit thereby avoiding human handling of the master microfiche.

BACKGROUND OF THE INVENTION

Various types of mechanisms for handling microfiche automatically to carry out various operations are known in the art. U.S. Pat. Nos. 4,049,342: 4,188,114; 4,056,321 and 4,354,787 all relate to such mechanisms and are all owned by the same assignee of the instant patent application. U.S. Pat. No. 4,049,342 is concerned with the transfer of microfiche from a cartridge to a microfiche viewer and discloses conveyor means including a separator arrangement to assure that only one microfiche at a time will be passed along the conveyor means. U.S. Pat. No. 4,188,114 discloses a microfiche scanner module capable of being substituted for a normal microfiche cartridge mechanism in a reader/printer projector to thereby enable the printing and displaying of data information stored on microfiche without requiring any major alterations in the reader/printer projector. U.S. Pat. No. 4,056,321 concerns a microfiche duplicator which may be of the type to which the transfer system of the present invention transports master microfiche. U.S. Pat. No. 4,354,787 is concerned primarily with a collating stacker for facilitating the separation of first and second sets of microfiche.

While the foregoing microfiche handling mechanisms serve their functions well, to the best of our knowledge, an effective microfiche transport or transfer system for passing master microfiche from a computer output microfiche unit to a duplicator unit has never, heretofore, been available. As a consequence, the practice has been to manually transfer the master microfiche to the duplicator which manual operation involves physically handling or touching of the master microfiche by operating personnel. While the transfer can be made in this manner, careful handling of the master microfiche is necessary to avoid smudging or damaging and thus the transfer operation itself takes time.

In further respect of the foregoing, the master microfiche are normally provided with a bar code containing instructions for the duplicator. For example, the bar code would tell the duplicator how many copies are to be made and whether or not to collate the various copies. In the event there is an error in the bar code such will not be detected until the duplicating operation begins. In other words, the duplicator will receive master microfiche with both good and bad bar codes and thus a substantial amount of time is wasted. If the master microfiche with bad bar codes or bar codes containing errors could be separated from those that are passed to the duplicator which have good bar codes, then the duplication process can be speeded up.

BRIEF DESCRIPTION OF THE PRESENT INVENTION

With the foregoing in mind, the present invention contemplates the provision of a microfiche transfer system for automatically transporting a master microfiche from a computer output microfiche unit to a duplicator unit to thereby avoid physical handling of the microfiche with human hands. The transfer system includes a conveyor means extending between the two units with appropriate motor means for driving the conveyor means. A sensor means is provided for energizing the motor means in response to reception at one end of said conveyor means of a master microfiche only if the remainder of the conveyor means is free of microfiche. Jamming of microfiche on the conveyor is thus avoided.

In addition, and in the preferred embodiment of the invention, the conveyor means includes a gate for diverting microfiche which contain errors in their bar codes. To this end, a bar code reading means is provided on the conveyor means to read the bar code and actuate an appropriate gate to divert microfiche with errors in their bar codes from reaching the duplicator.

BRIEF DESCRIPTION OF THE DRAWINGS

The foregoing as well as further features and advantages of the present invention can better be appreciated by referring to the accompanying drawings in which:

FIG. 3 illustrates a typical master microfiche with a bar code thereon;

FIG. 4 is a schematic view of a portion of the transfer system illustrated in FIG. 2 showing the position of components when a master microfiche is being properly passed to the duplicator;

FIG. 5 is a view similar to FIG. 4 but showing the position of various components when a master microfiche is diverted from being passed to the duplicator; and, FIG. 6 is a function vs. time schematic diagram useful in explaining the operation of the transfer system of the present invention.

DETAILED DESCRIPTION OF THE PREFERRED EMBODIMENT

Figure 1:
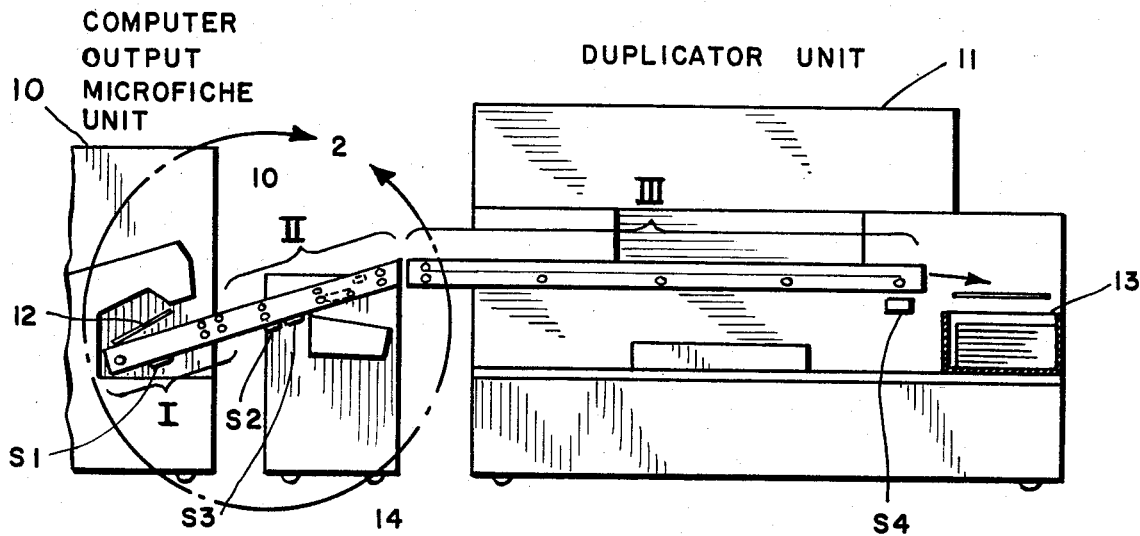
FIG. 1 is a front elevational view partly schematic and partly fragmentary illustrating the transfer system for passing a master microfiche from a computer output microfiche unit to a duplicator unit.

Referring first to the left portion of FIG. 1, there is shown part of a computer output microfiche unit 10 for generating master microfiche. To the right in FIG. 1 there is shown a duplicator unit 11. As mentioned, the usual practice has been to transfer master microfiche such as indicated at 12 from the computer output microfiche unit 10 to the duplicator unit 11 for duplication by hand. Thus, the master microfiche such as indicated at 12 would be hand carried over to a feeder hopper 13 for the duplicator unit 11.

As also mentioned heretofore, the master microfiche normally would include a bar code containing instructions to the duplicator unit with respect to the number of duplications to be made and the manner in which the same are to be collated. Any error in the bar code would normally not be detectable until the master microfiche were placed in the feeder hopper 13 of the duplicator unit and the bar code read by the duplicator.

Still referring to FIG. 1, in accord with the present invention, there is provided a microfiche transfer system for automatically transporting the master microfiche 12 from the computer output microfiche unit 10 to the duplicator unit 11 thereby avoiding the physical handling of the microfiche. This transfer system is designated generally by the numeral 14 in FIG. 1 and comprises essentially a conveyor means made up of three conveyor sections. The first section is indicated by I at the one end of the entire conveyor means adjacent to the computer output microfiche unit. A second section is designated by II and the third section by III. The third section III constitutes essentially a simple belt conveyor for receiving microfiche from the second section II and delivering the same to the feed hopper 13 of the duplicator unit 11. Microfiche sensors designated by the letters S1, S2, S3 and S4 are positioned on the conveyor system shown in FIG. 1 and their functions will be described subsequently.

Figure 2:
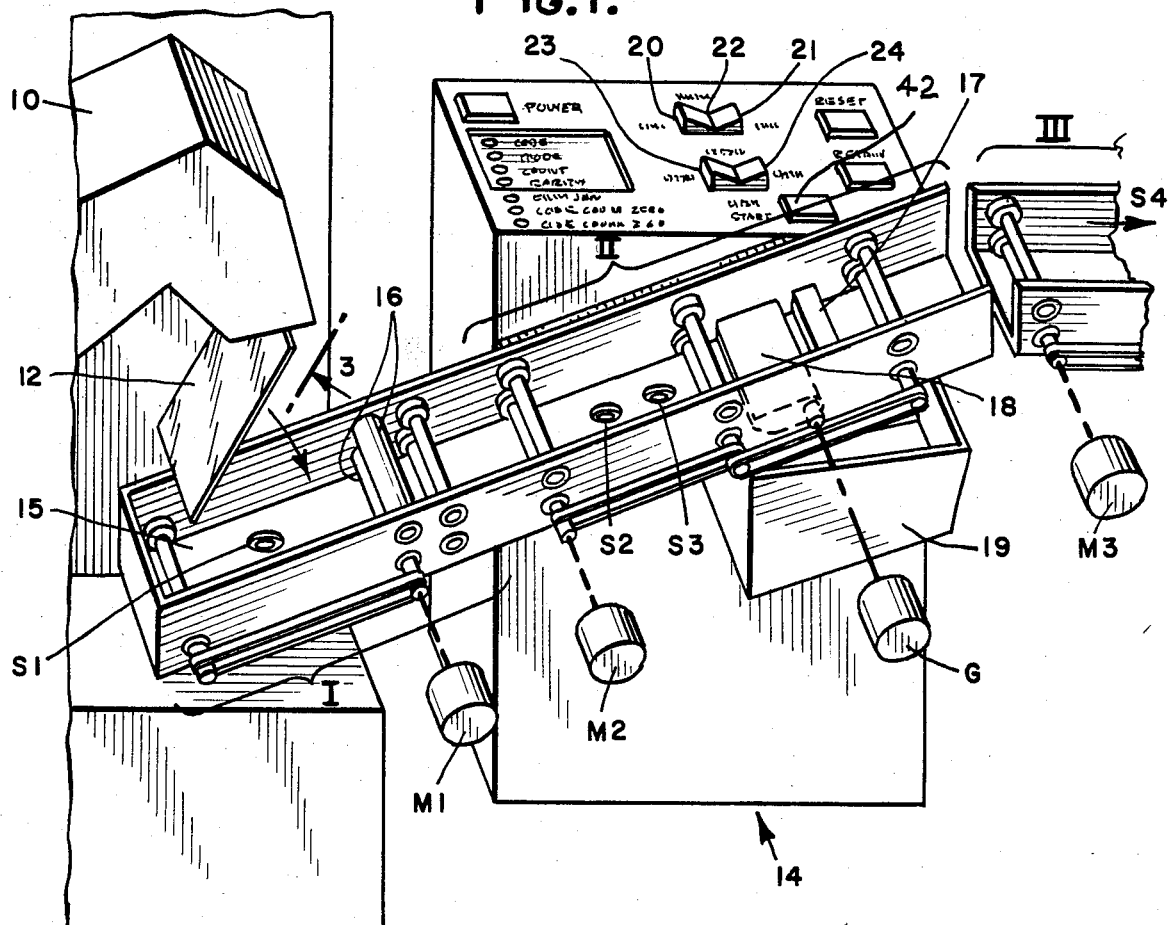
FIG. 2 is a greatly enlarged perspective fragmentary view of that portion of FIG. 1 enclosed within the circular arrow 2.

Referring now to the enlarged perspective view of FIG. 2, the first conveyor section I is provided with a receiving area 15 positionable to receive the master microfiche 12 from the computer output microfiche unit 10. A first motor M1 for operating the first conveyor section I is provided as schematically indicated for driving appropriate conveyor rollers connected together on their outer sides by belts.

The second conveyor section II, in turn, is driven by a second motor M2, there again being provided various exterior side belts between the rollers so that the motor M2 need only connect to one roller which will drive the others.

The last section III is driven by a motor M3.

A first sensor S1 is shown in FIG. 2 in the receiving area 15 on the first section and is responsive to reception of a master microfiche such as 12 in the receiving area to energize the first and second motors M1 and M2. However, these motors are only energized if the second and third conveyor sections II and III are free of microfiche. In this respect, the motors M1 and M2 can only be energized by the first sensor S1 after the last sensor S4 shown in FIG. 1 and responsive to a microfiche being deposited in the feeder hopper 13 for the duplicator 11 has been triggered. In other words, the last microfiche on the conveyor system must be deposited in the feeder hopper 13; that is, have triggered the sensor S4 in order that the motors M1 and M2 will be responsive to the first sensor S1 to handle the next microfiche.

As shown in FIG. 2 in the conveyor section I there is provided a separating means comprised of upper and lower rollers 16 between which the master microfiche passes. The rollers 16 both rotate in the same direction which would be clockwise as viewed in the perspective view of FIG. 2. When the lower roller 16 is rotating clockwise, it will be appreciated that it will tend to drive a master microfiche from left to right as viewed in FIG. 2. With the top roller 16 rotating clockwise, it will be appreciated that it will tend to frictionally move the microfiche from right to left; that is, in a rearward direction. However, the spacing between the rollers is such as to accommodate the single microfiche. If two microfiche are stuck together, then the overall thickness will be such that the top roller 16 will engage the top microfiche and drive it from right to left, thereby separating it from the bottom microfiche which will be driven in a forward direction.

A separator of the foregoing type is described in the heretofore referred to U.S. Pat. No. 4,049,342.

The second section II includes a second sensor S2 which is responsive to the leading edge of a microfiche passing thereover, to stop the first motor M1. A third sensor S3, forward of the second sensor S2, is responsive to the trailing edge of the microfiche to reverse the direction of the second motor M2 after a given time delay. As a consequence, a microfiche is reversed in direction so that it will be driven rearwardly. A bar code reader 17 is positioned to read the bar code on the microfiche as it is moved in a reverse or rearward direction in response to reversal of the second motor.

The now trailing edge of the reverse microfiche which was heretofore the leading edge triggers the third sensor to again reverse the motor back to its original direction to thereby move the microfiche in a forward direction.

An error gate designated by the numeral 18 is provided forward of the third sensor S3 and is responsive to the bar code reader 17 to open and thereby divert a microfiche from the second section II in the event the bar code contains an error. The diverted microfiche is received in an error hopper 19 disposed beneath the second conveyor II. The error gate 18 will remain closed in the event that there is no error in the bar code so that the microfiche is passed forwardly to the third conveyor section III. The third motor M3 is actuated in response to a correct bar code reading by the bar code reader 18 and will thus transport the microfiche to the feed hopper 13 for the duplicator described in FIG. 1.

A fourth sensor S4 as already heretofore described is adjacent to the end of the third conveyor section III as shown in FIG. 1 and is responsive to delivery of the microfiche into the feed hopper to de-energize the second and third motors M2 and M3 and condition all motors for subsequent repeat operation when the cycle is duplicated.

The error gate 18 described in FIG. 2 may be solenoid operated as schematically indicated by the solenoid G in FIG. 2. In addition, various switch means which will be described subsequently are shown on the console support unit for the conveyor as at 20, 21, 22 and 23.

Referring now to FIGS. 3, 4 and 5, the foregoing briefly described operation of the transfer system will be better understood. Considering first FIG. 3, there is shown a typical master microfiche 12 having a bar code which in the example illustrated is at the lower right hand margin.

Referring to the schematic showing of FIG. 4, the master microfiche 12 is shown in solid lines on the upper portion of the conveyor section 11 the same having passed over the error gate 18. The described delay time after the trailing edge of the microfiche 12 passes over the third sensor S3 permits further travel of the microfiche 12 up the conveyor past the solid line position shown by arrow 25 before the motor M2 is reversed. Reversal of the motor M2 will move the microfiche 12 in a rearward direction shown by arrow 25' to the dotted line position indicated at 12' in FIG. 4. In this position, the now trailing edge of the microfiche 12 which was the leading edge when the microfiche was moving in a forward direction triggers the third sensor S3 to again reverse the motor M2 and start to drive the microfiche back up the conveyor.

When the microfiche was moving in a reverse direction or rearwardly down the conveyor, the bar code reader 17 read the bar code. The bar code reader thus has information as to whether the bar code is correct or not or whether a bar code was even present. When the microfiche reaches the dotted line position 12' wherein the then trailing edge triggers the sensor S3 to reverse the motor, should the bar code have been incorrect, the error gate 18 will be actuated in response to the incorrect code read by the bar reader 17 to an open position as illustrated in FIG. 5. As the microfiche 12 is then moved up the conveyor from the dotted line position shown in FIG. 4, it will be diverted into the error hopper 19 again as shown in FIG. 5.

If the code read by the reader 17 is correct, then the error gate 18 will not be actuated and when the motor M2 is again reversed to drive the microfiche in a forward direction, it will pass from the position shown at 12' in FIG. 4 simply up the ramp to the third section III of the conveyor and thence be deposited in the feed hopper for the duplicator as described heretofore.

Figure 6:
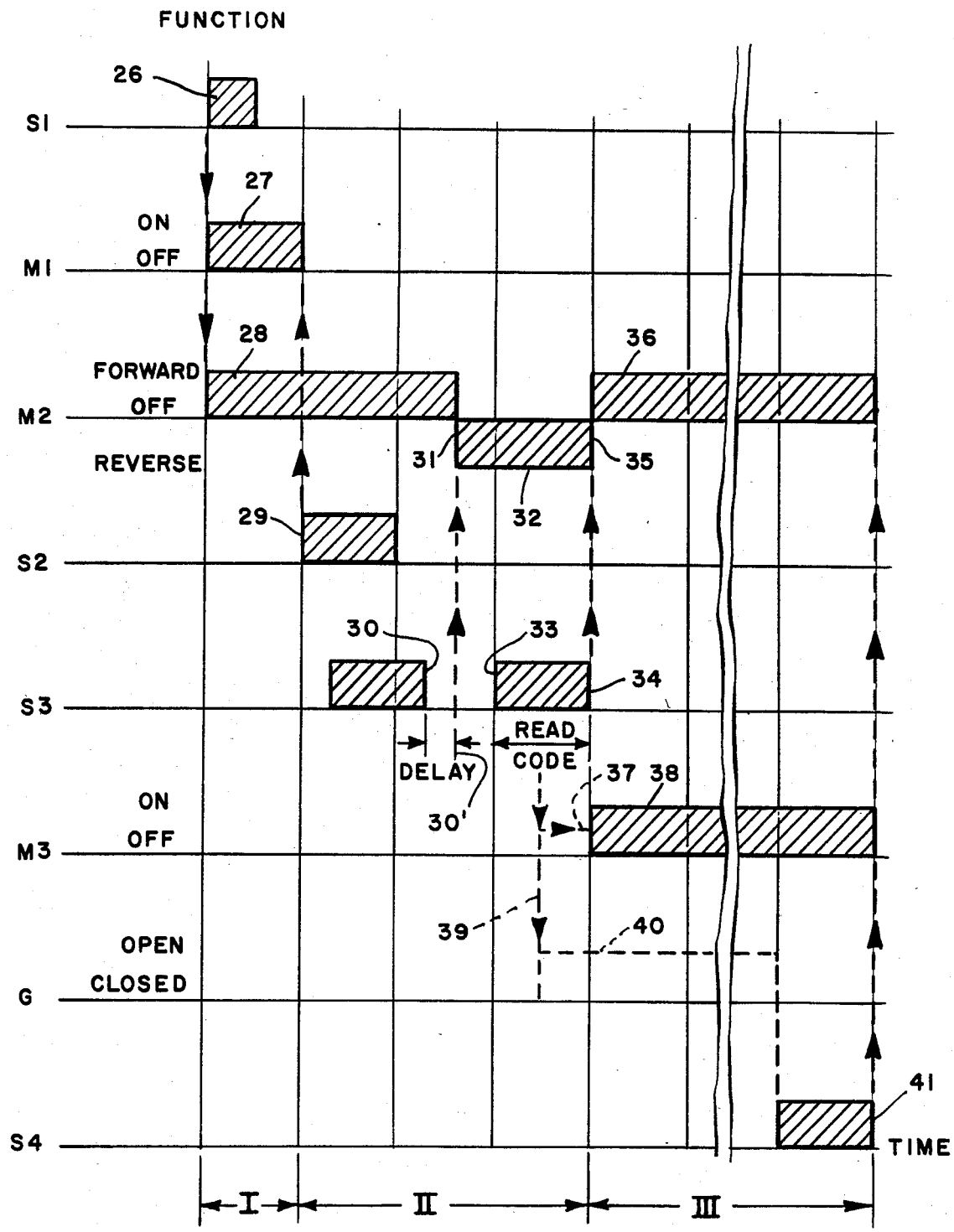

The foregoing operations as described, are summarized by the function-time diagram of FIG. 6. In this respect, the three sections of the conveyor successively passed by a microfiche are indicated in the lower portion of FIG. 6 by the Roman numerals I, II and III.

The various sensors and motors as well as the solenoid G to drive the error gate are schematically indicated by horizontal lines in the diagram of FIG. 6. When one of the sensors is triggered, the shaded block indicates the time period during which the microfiche overlies the sensor, the leading and trailing edges of the microfiche corresponding to the beginning and end vertical lines of the block.

The status of the various motors M1, M2 and M3, in turn, are indicated by the shaded blocks.

Starting at the moment in time when a master microfiche is initially received in the receiving area of the conveyor section I, the first sensor S1 is triggered by the presence of the microfiche and the leading edge of the microfiche passing over the sensor S1 indicated at 26 will turn on the motor M1, its status being indicated as ON by the raised portion 27 and also will turn on the motor M2, its status of being ON being indicated by the raised portion 28. When the leading edge of the microfiche reaches the sensor S2 in section II as at 29, the motor M1 is turned off and the motor M2 stays on to drive the microfiche forwardly.

When the sensor S3 is triggered by the trailing edge indicated at 30 in FIG. 6, there is provided a time delay indicated at 30' after which an appropriate signal reverses the motor M2 indicated by the vertical line 31 and the lower block level 32. During this reversal, the microfiche bar code is read as indicated in FIG. 6. Triggering of the reading of the bar code is accomplished by the now leading edge 33 of the microfiche when it passes rearwardly over the sensor S3. The time that the motor M2 is again reversed is accomplished by the now trailing edge 34 of the microfiche passing over the sensor S3 to reverse the motor back to its original direction as indicated by the vertical line 35 in FIG. 6. The top of the shaded block indicated at 36 shows that the motor M2 is now operating in a forward direction.

If the bar code is correct; that is, if it contains no error, then the motor M3 will be energized as indicated at 37 from the output of the bar code reader. The ON status of the motor M3 is indicated at 38 in FIG. 6.

If the bar code reader detected an error in the bar code, on the other hand, then the motor M3 is not energized but rather the gate G solenoid is energized indicated by the dashed line 39 in FIG. 6 thereby resulting in an opening of the gate. This opening of the gate is indicated by the dashed line 40 in FIG. 6, the same being represented in phantom since it would not normally be open if the motor M3 were operating.

The microfiche in the event the gate is open will be received in the error hopper as described.

When the sensor S4 is triggered by having the trailing edge 41 of the microfiche pass thereover, the motors M2 and M3 are de-energized and the microfiche itself is deposited into the feeder hopper for the duplicator. All of the components are now set for the cycle to repeat when the next master microfiche is received in the receiving area 15 of the first section of the conveyor as described heretofore.

Referring once again back to FIG. 2, it will be noted on the console unit supporting the conveyor section II there are provided switch means 20, 21, 22, 23 and 24 briefly alluded to heretofore.

The foregoing switch means are illustrated merely as representative of further features that may be incorporated in the transfer unit. For example, the switch 20 can be depressed to effect a transport override causing the error gate 18 to remain open so that all microfiche will be transported from the computer output microfiche unit to the error hopper 19. This might be desirable in the event the duplicator were being serviced or were out of operation.

Operation of the switch means by depression of the portion 21 shown in FIG. 2, in turn, could function as a bar code override for rendering the bar code reader 17 ineffective so that all microfiche will be transferred to the feed hopper 13 for the duplicator regardless of whether or not the bar code contains an error. In its center position 22, the unit reads the bar code.

The switch means 23 shown in FIG. 2, in turn, might constitute an error monitor mode switch means for assuring that all standard master microfiche following an error microfiche will be diverted into the error hopper until a master change microfiche is detected at which time normal operation would resume and the masters following an error-free change master will be transferred to the feed hopper on the duplicator. This switch means 23 would be used when the apparatus is unattended.

A further switch means 24 constituting an error stop mode switch means could be provided for de-energizing all of the motors: that is, the first, second and third motors for a given time period in response to an error microfiche being diverted into the error hopper. An alarm might simultaneously be sounded so that personnel in the area would be alerted. By having the transport motors de-energized for only a given time period, after the given time period had lapsed assuming that personnel were not in the area even though an alarm had rung, normal operation could resume when a change master is received.

It should be understood in the description thus far, that by a "change master" is meant the first master microfiche defining a specific job. This change master is followed by one or more standard master microfiche. If the change master microfiche has a correct bar code and the standard following microfiche have correct codes, an entire job operation will be carried out in accord with the instructions on the change master. A next change master will similarly define a different job for the following master microfiche.

It should be further understood that the diverting error gate is also operative in response to the complete absence of a bar code, or where a bar code copy count data is zero, or where any job that will exceed the bin capacity of the collator in the collate mode is indicated by the bar code.

Since the "bad" microfiche are eliminated from the duplicator, the operation of the duplicator can be greatly speeded up.

The console of FIG. 2, in a preferred embodiment, is also provided with a three digit switch 42 to set the accumulated copy count to start the duplicating cycle. This feature is incorporated to save on copy film by providing the duplicator with a number of masters at all times to prevent film waste due to clearing the duplicator after the master supply is exhausted.

A switch not accessable to the operator, is factory set to limit the number of masters in the duplicator hopper to prevent over-filling of the hopper. It will take over the start command when its limit is reached without reaching the limit of the set copy count.

From all of the foregoing, it will be understood that the present invention not only provides for an automatic transfer of microfiche from the computer output microfiche unit to the duplicator unit without the necessity of any human handling of the microfiche, but additionally automatically elimiates those microfiche containing an error in the bar code, all to the end that the entire duplicating process can become considerably more efficient than possible with prior art techniques.

We claim:

1. A microfiche transfer system for automatically transporting a master microfiche from a computer output microfiche unit to a feed hopper of a duplicator unit wherein the master microfiche is provided with a bar code defining duplicating instructions for said duplicator unit, said transfer system including, in combination:

(a) a first conveyor section having a receiving area positioned to receive a master microfiche from said computer output microfiche unit;

(b) a first motor for operating said first conveyor section;

(c) a second conveyor section positioned to receive microfiche from said first conveyor section;

(d) a second motor for operating said second conveyor section;

(e) a third conveyor section positioned to receive microfiche from said second conveyor section and deposit said microfiche into said feed hopper for said duplicator unit;

(f) a third motor for operating said third conveyor section;

(g) a first sensor on said first section responsive to reception of a master microfiche in said receiving area to energize the first and second motors only if the second and third conveyor sections are free of microfiche;

(h) separator means on said first section responsive to operation of said first motor for assuring that only one microfiche at a time is passed to said second section;

(i) a second sensor in said second section responsive to the leading edge of a microfiche passing thereover to stop said first motor;

(j) a third sensor forward of said second sensor in said second section responsive to the trailing edge of said microfiche to operate said second motor to reverse the direction of second conveyor section after a given time delay;

(k) a bar code reader in said second section positioned to read the bar code on said microfiche as it is moved in a rearward direction in responsive to reversal of said second motor, the now trailing edge of said microfiche triggering said third sensor to operate the second motor to move said second conveyor section to carry the microfiche in a forward direction;

(l) an error gate in said second section forward of said third sensor and responsive to said bar code reader to open and thereby divert a microfiche from said second section in the event said bar code contains an error so that the diverted microfiche is not received on said third conveyor section, said error gate remaining closed in the event there is no error in said bar code so that said microfiche is passed forwardly to said third conveyor section, said third motor being actuated in response to a correct bar code reading and operable to transport said microfiche to said feed hopper on said duplicator; and (m) a fourth sensor adjacent to the end of said third conveyor section and responsive to delivery of said microfiche into said feed hopper to de-energize the second and third motors.

2. A transfer system according to claim 1, including an error hopper positioned to receive microfiche diverted by said gate when said gate is opened.

3. A transfer system according to claim 2, including transport override switch means for causing said error gate to remain open so that all microfiche will be transported from said computer output microfiche unit to said error hopper.

4. A transfer system according to claim 2, including bar code override switch means for rendering said bar code reader ineffective so that all microfiche will be transferred to said feed hopper on said duplicator.

5. A transfer system according to claim 2, including error monitor mode switch means for assuring that all standard master microfiche following a microfiche with an incorrect bar code will be diverted into said error hopper until a master change microfiche is detected at which time normal operations resume and the masters following an error-free change master will be transferred to said feed hopper on said duplicator.

6. A transfer system according to claim 2, including error stop mode switch means for de-energizing said first, second and third motors for a given time period in response to a microfiche with an incorrect bar code being diverted with an incorrect bar code.

* * * * *